Oct. 11, 1966    J. O. McDONALD ETAL    3,277,534
APPARATUS FOR MOLDING HOLLOW PLASTIC ARTICLES
Filed Nov. 7, 1963
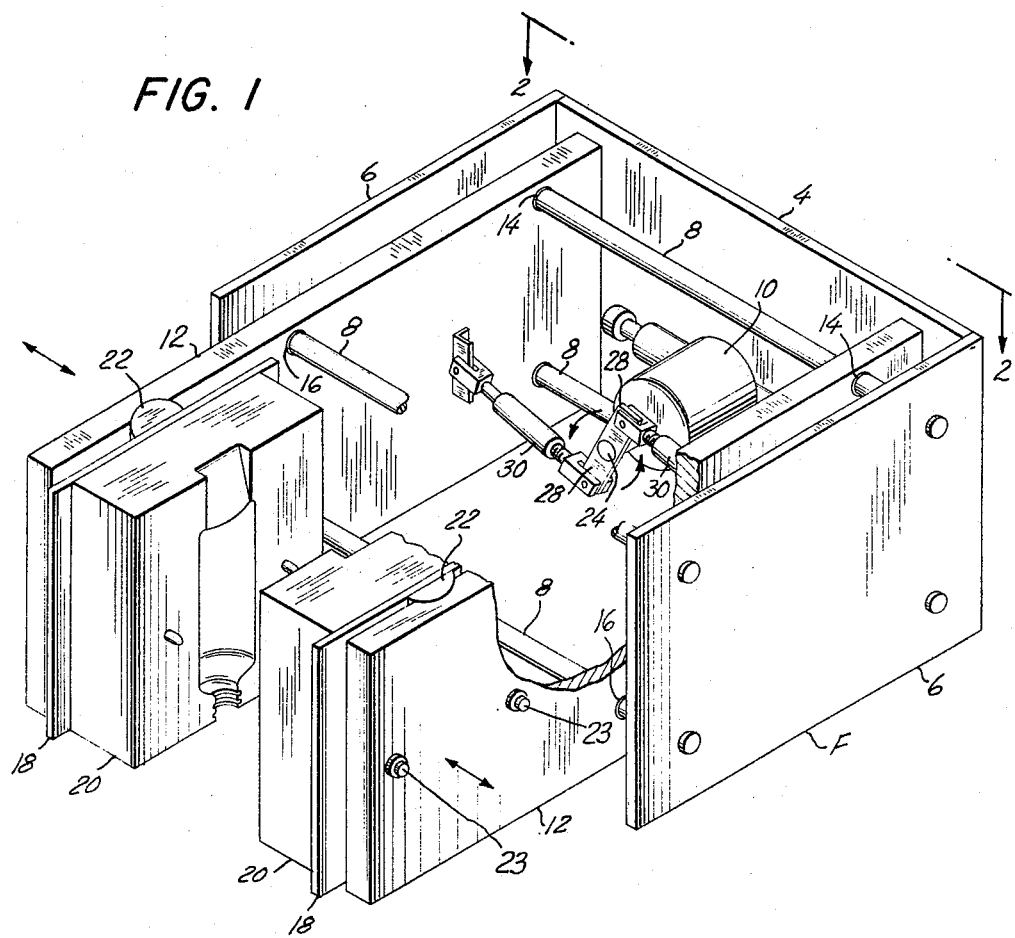
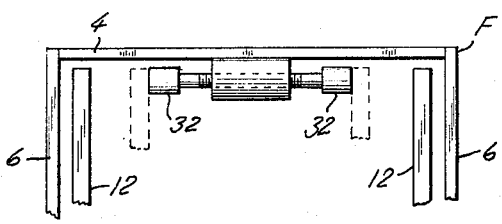
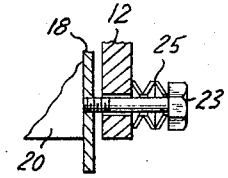
INVENTORS
JOHN O. McDONALD
ROBERT J. STOCKMAN
BY
*Barnwell P. King*
ATTORNEY

United States Patent Office 3,277,534
Patented Oct. 11, 1966

3,277,534
APPARATUS FOR MOLDING HOLLOW PLASTIC ARTICLES
John O. McDonald, Englishtown, and Robert J. Stockman, Bernardsville, N.J., assignors to Union Carbide Corporation, a corporation of New York
Filed Nov. 7, 1963, Ser. No. 322,170
5 Claims. (Cl. 18—43)

This invention relates to apparatus for molding hollow plastic articles, and more particularly to means for supporting and actuating mold parts.

The main object of the invention is to provide a mold clamping unit having access to mold halves from 3 sides with no interfering tie rods, guide rod or supports, that is light in weight as well as compact, and includes means whereby the plane of the closed mold parting line can be adjusted on either side of center.

The invention provides a highly compact and very efficient mold clamping unit comprising a box-like frame which is open at the front, top and bottom. Generally parallel plates are carried for movement on transverse guide rods the ends of which are secured to the side walls of such frame. Mold half-parts are mounted on platens which are, in turn, mounted on the plates which extend forwardly beyond the front of the open frame. The mold is closed and opened by simultaneously moving the plates toward and away from each other by means of a motor operated toggle mounted on the rear wall of the frame between the rearwardly extending portions of the plates. The mold parts are held closed by cushioned stops for the plates which react to lock the toggle.

Prior blow mold platen clamps usually incorporate tie or guide rods between the moving platens which can interfere with other auxiliary equipment passing between the open mold. In such types the tie or guide rod and/or the platen itself is an obstruction to the entrance of a newly formed parison, moving blowstick or pin and the exit or ejection of a blown bottle or piece.

In the present case, the unit provides means to which mold halves are attached parallel to each other, with no appurtenances above, below, in front of, or between them; the unit being of relatively small overall width.

The incorporation of a "toggle" also provides for a fast-close with slow down which reduces the cost of the hydraulic circuit for the motor or rotary actuator.

The use of sliding spherical bearings is an innovation operative so that, if the platens deflect slightly, they will still slide freely and not seize on the guide rods.

The unit also has a smaller overall width than prior commercial units of the same mold capacity. This permits a greater number of molds to be used in a given space, thus reducing machine costs—especially when platens are mounted on rotating tables.

In the drawing:

FIG. 1 is a fragmentary perspective view of a unit illustrative of the invention, with parts broken away to show the interior of the unit;

FIG. 2 is a reduced fragmentary top plan view of the rear portion of such unit; and FIG. 3 is an enlarged fragmentary sectional view of a detail of the unit shown in FIG. 1.

The illustrated unit comprises a three sided box or frame F having a rear wall 4 and side walls 6, 6 to which four parallel guide rods 8 are attached. A motor 10 is mounted on the rear wall 4. The four transverse guide rods 8 support and guide two platen backup plates 12 having suitable passages for such rods. Two spherical sleeve bearings 14, in each backup plate 12, located at the rear, or end opposite from the mold location, allow the plane of each plate to assume any small angle of deviation from 90° relative to the rear guide rod. Two other sleeve bearings 16 in each backup plate 12, between the mold end and rear of the plate, are long, closely fitted sleeve bearings which hold the plane of each backup plate very close to 90° relative to the front guide rods.

The platens 18, to which mold halves 20 are bolted, have half of a vertical cylinder 22 made of brass, fastened to the back of the platen 18 on the platen's vertical centerline. Such half cylinder fits in a cylindrical groove in the backup plate 12 and allows the platen and the corresponding half of the mold to rotate about the vertical centerline of the half cylinder, and thereby allow equal clamping pressure over the whole mold parting plane surface, when backup plate 12 deflects at clamping pressures. When the mold halves are in the open position the mold faces are held parallel to each other by 2 capscrews 23, screwed into the back of platen 18 extending through clearance holes in plates 12. Heavy dished (Belleville) springs 25 contact the underside of the head of the capscrews and the back of plates 12.

The mold is operated by the motor 10, which is fastened to the stationary frame, in the following way:

The hydraulic oil pressure is switched to make armature 24 rotate crank arm 28, 28 in a counterclockwise direction. Crank arms 28, 28 in turn, pull both connecting links 30, 30, which actually are heavy turnbuckles used to vary clamp pressure and vary the location of the plane of the mold parting line relative to the stationary frame or parison centerline, toward the center of the unit and, in turn, pull the backup plates 12, platens 18 and mold halves 20 together. The resulting toggle effect gives a fast mold close with slow down and a very high clamping force. Near the rear of the unit and fastened to the frame 4 are two adjustable stops 32, 32 which contact the backup plates 12 at the same time the mold halves parting lines make contact and provide a closed mold. The stops 32 and the mold 20, when the unit is closed, provide the reaction forces created by such toggle parts which are located about half way between the stops and the centerline of the mold.

What is claimed is:

1. Apparatus for molding hollow articles of plastic material, comprising an open box-like frame having vertical side and rear walls; transverse guide rods mounted on said side walls; generally parallel plates each having an inner portion carried by said rods on spherical bearings, and an outer portion extending forwardly in front of the front edges of said side walls; platens mounted on the inner sides of such outer portions of the plates for limited movement about vertical bearings; a mold including half-parts mounted on the inner sides of said platens to provide at least one mold cavity when closed; and means inside said box-like frame for opening and closing said mold by moving said plates toward and away from each other on said rods, comprising a toggle including a crank having arms extending in opposite directions from each other, links connecting said arms to said plates, a motor having a horizontal armature connected to the center of said crank, and adjustable stops mounted on said rear wall in the path of said plates for locking said toggle to secure the mold parts together in closed relationship.

2. Apparatus as defined by claim 1, including means permitting universal self-adjustment of said mold half-parts when they are clamped together.

3. Apparatus as defined by claim 1, in which the means for moving said plates includes a toggle mechanism, and a motor for operating said mechanism.

4. Apparatus as defined by claim 3, provided with means for adjusting the plane of the closed parting line of said mold half-parts on either side of center, comprising adjustable toggle mechanism stops mounted on said frame.

5. Apparatus for producing hollow articles of plastic material comprising a frame including a rear wall and side walls extending forwardly therefrom; four horizontal guide rods having their ends connected to said side walls, adjacent to the corners of the latter, said rods being arranged in substantially parallel relationship with one another to said side wall; a pair of platen backup plates the inner portions of which disposed on the inside of said frame, said plates having holes through which said rods extend; bearings disposed in such holes and riding on said bars for permitting a certain amount of freedom of tilting movement of the plates on the rear rods, in addition to movement longitudinally thereon; a mold platen mounted on the inner side of the outer portion of each of said plate for limited movement about a vertical axis; a mold composed of molding halves facing each other between said platens; means securing said mold halves to said platens; a length-adjustable link connected to the inner side of each of said plates; a common crank having arms connected to the inner portions of each link; a motor mounted on the inner side of the rear wall of said frame, said motor having an armature connected to the center of said crank for moving said plates toward and away from each other through said crank arms and links; and adjustable stops mounted on said frame for limiting the inward movement of each of said plates; said crank arms and links constituting a toggle which is locked by reaction with said stops and upon closure of the mold halves as the plates are drawn toward each other by said armature.

References Cited by the Examiner

UNITED STATES PATENTS

| | | |
|---|---|---|
| 1,323,582 | 12/1919 | Dow. |
| 3,067,598 | 12/1962 | Schirm. |
| 3,070,860 | 1/1963 | Fanwick. |

FOREIGN PATENTS

| | | |
|---|---|---|
| 933,837 | 8/1963 | Great Britain. |

J. SPENCER OVERHOLSER, *Primary Examiner.*

J. H. FLINT, *Assistant Examiner.*